(12) United States Patent
Kishimoto et al.

(10) Patent No.: US 8,289,125 B2
(45) Date of Patent: *Oct. 16, 2012

(54) SEMICONDUCTOR CERAMIC AND POSITIVE TEMPERATURE COEFFICIENT THERMISTOR

(75) Inventors: Atsushi Kishimoto, Nagaokakyo (JP); Hayato Katsu, Nagaokakyo (JP); Masato Goto, Nagaokakyo (JP); Naoaki Abe, Nagaokakyo (JP); Akinori Nakayama, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/111,194

(22) Filed: May 19, 2011

(65) Prior Publication Data

US 2011/0215894 A1 Sep. 8, 2011

Related U.S. Application Data

(63) Continuation of application No. PCT/JP2009/070759, filed on Dec. 11, 2009.

(30) Foreign Application Priority Data

Dec. 12, 2008 (JP) ................................ 2008-317475

(51) Int. Cl.
*H01C 7/10* (2006.01)
(52) U.S. Cl. ...... 338/22 R; 338/320; 338/224; 252/511; 428/328
(58) Field of Classification Search ................ 338/22 R, 338/24, 320, 223, 224; 252/500, 511–514; 428/404, 325, 328, 331; 501/134, 123
See application file for complete search history.

(56) References Cited

U.S. PATENT DOCUMENTS

| 4,956,320 | A | * | 9/1990 | Asakura et al. | ............... | 501/137 |
| 5,414,403 | A | * | 5/1995 | Greuter et al. | ............... | 338/22 R |
| 5,814,849 | A | * | 9/1998 | Azuma et al. | ................. | 257/295 |
| 6,221,800 | B1 | * | 4/2001 | Takahashi et al. | ............ | 501/137 |
| 6,542,067 | B1 | * | 4/2003 | Kawamoto | .................. | 338/22 R |
| 7,764,161 | B2 | | 7/2010 | Katsu et al. | | |

(Continued)

FOREIGN PATENT DOCUMENTS

CN 101013618 A 8/2007

(Continued)

OTHER PUBLICATIONS

Blanchart, P., Influence of Calcium Addition on the Microstructure and the Electrical Properties at Room Temperature of $BaTiO_3$ for TC Thermistors, Silicates Industriels, 1994, vol. 59, (1-2), pp. 47-52.

(Continued)

*Primary Examiner* — Kyung Lee
(74) *Attorney, Agent, or Firm* — Dickstein Shapiro LLP

(57) ABSTRACT

A semiconductor ceramic includes a $Ba_mTiO_3$-based composition, as a main component, having a perovskite structure represented by general formula $A_mBO_3$. The molar ratio m between the A site and the B site satisfies $1.001 \leq m \leq 1.01$. Part of Ba constituting the A site is replaced with Bi, Ca, a rare-earth element, and Na. The molar content of the Ca when the total number of moles of the elements constituting the A site is 1 mole is 0.05 to 0.20 (preferably 0.125 to 0.175). A PTC thermistor includes a component body formed of the semiconductor ceramic. Accordingly, there is provided a lead-free semiconductor ceramic that substantially does not contain lead and that has desired PTC characteristics and high reliability.

19 Claims, 1 Drawing Sheet

U.S. PATENT DOCUMENTS 8,093,170 B2 * 1/2012 Katsu ........................... 501/134
2009/0201121 A1 8/2009 Katsu et al.

FOREIGN PATENT DOCUMENTS

| | | | |
|---|---|---|---|
| JP | 55-095673 A | | 7/1980 |
| JP | 56-169301 A | | 12/1981 |
| JP | 05-275203 A | | 10/1993 |
| JP | 10-152372 A | | 6/1998 |
| JP | 10152372 | * | 6/1998 |
| JP | 2005-255493 | * | 9/2005 |
| JP | 2005-255493 A | | 9/2005 |
| JP | 2006179692 A | | 7/2006 |
| JP | 2007001821 A | | 1/2007 |
| JP | 2008063188 A | | 3/2008 |
| JP | 20060263711 A1 | | 8/2009 |
| WO | WO-2008-038538 A1 | | 4/2008 |
| WO | WO-2008152976 A1 | | 12/2008 |

OTHER PUBLICATIONS

Written Opinion of the International Searching Authority, mailed Feb. 16, 2010.

* cited by examiner ical to a semiconductor ceramic having a positive tempera-
SEMICONDUCTOR CERAMIC AND POSITIVE TEMPERATURE COEFFICIENT THERMISTOR This is a continuation of application Ser. No. PCT/JP2009/070759, filed Dec. 11, 2009, the entire contents of which is hereby incorporated herein by reference.

TECHNICAL FIELD

The present invention relates to a semiconductor ceramic and a positive temperature coefficient thermistor, and specifically to a semiconductor ceramic having a positive temperature coefficient (hereinafter referred to as "PTC characteristic") and a positive temperature coefficient thermistor (hereinafter referred to as "PTC thermistor") used for a heater or the like.

BACKGROUND ART

A barium titanate ($BaTiO_3$)-based semiconductor ceramic generates heat upon the application of a voltage and has PTC characteristics in which the resistance value rapidly increases when the temperature exceeds the Curie temperature Tc at which there is a phase transition from a tetragonal crystal to a cubic crystal.

In such a semiconductor ceramic having PTC characteristics, the resistance value increases when the temperature exceeds the Curie temperature Tc because of the generation of heat caused by the application of a voltage. As a result, current does not easily flow and the temperature is decreased. When the temperature is decreased and thus the resistance value is decreased, a current easily flows again and the temperature is increased. In such a semiconductor ceramic, by repeating the above-described process, the temperature or current is caused to converge to a certain temperature or current. Therefore, such a semiconductor ceramic is widely used as a thermistor for a heater or a motor starting device.

Since a PTC thermistor used for a heater or the like is used at a high temperature, the Curie temperature Tc is required to be high. Therefore, the Curie temperature Tc has been conventionally increased by replacing part of Ba of $BaTiO_3$ with Pb.

However, Pb is an environmentally unfriendly substance and thus, in consideration of environment, the development of a lead-free semiconductor ceramic that substantially does not contain Pb has been demanded.

Patent Document 1 discloses a method for producing a $BaTiO_3$-based semiconductor ceramic, the method including adding at least one of Nb, Ta, and a rare-earth element to a structure of $Ba_f(BiNa)_xTiO_3$ (where $0<x \leq 0.15$) obtained by replacing part of Ba of $BaTiO_3$ with Bi—Na, sintering the structure in a nitrogen atmosphere, and performing a heat treatment in an oxidizing atmosphere.

In Patent Document 1, there is provided a lead-free $BaTiO_3$-based semiconductor ceramic having a high Curie temperature Tc of 140 to 255° C. and a temperature coefficient of resistance of 16 to 20%/° C.

Patent Document 2 discloses a semiconductor ceramic composition whose composition formula is represented by $[(A1_{0.5}A2_{0.5})_x(Ba_{1-y}Q_y)_{1-x}]TiO_3$ (where A1 is at least one of Na, K, and Li, A2 is Bi, and Q is at least one of La, Dy, Eu, and Gd), wherein the x and y satisfy $0<x \leq 0.2$ and $0.002 \leq y \leq 0.01$.

Also in Patent Document 2, there is provided a lead-free semiconductor ceramic composition having a Curie temperature Tc of 130° C. or more.

Patent Document 1 Japanese Unexamined Patent Application Publication No. 56-169301
Patent Document 2 Japanese Unexamined Patent Application Publication No. 2005-255493

Problems to be Solved by the Invention

A PTC thermistor for heater use may be exposed in a high-humidity atmosphere for a long time, and therefore the PTC thermistor is required to have high reliability to the extent that the degradation of its performance is prevented even in such a high-humidity atmosphere.

Since the semiconductor ceramics disclosed in Patent Documents 1 and 2 contain an alkali metal element such as Na, Li, or K, alkali metal ions may be eluted when the semiconductor ceramics are exposed in a high-humidity atmosphere for a long time. Such eluted alkali metal ions react with water vapor contained in the atmosphere and an alkali hydroxide is produced. The alkali hydroxide enters the outer electrodes of the PTC thermistor and erodes the outer electrodes, which may increase the resistance value. In addition, the eluted alkali metal ions are precipitated in the grain boundaries in the form of an alkali hydroxide and thus the grain boundary resistance is increased. This may also increase the resistance value. Particularly in the case of a thermistor for a heater, the resistance value is preferably low.

When the semiconductor ceramics disclosed in Patent Documents 1 and 2 are exposed in a high-humidity atmosphere for a long time, the resistance value is degraded over time and thus the reliability may be impaired.

In view of the foregoing, an object of the present invention is to provide a lead-free semiconductor ceramic that substantially does not contain lead and that has desired PTC characteristics and high reliability and a PTC thermistor that uses the semiconductor ceramic.

Means For Solving The Problems

Through the intensive study of a $\{Ba,(Na,Bi),Ca,Ln\}_m TiO_3$-based material (Ln being a rare-earth element) having a perovskite structure (general formula $A_m BO_3$), the inventors of the present invention have found that, by setting the molar ratio m between the A site and the B site within the range that achieves a slightly A-site-rich state compared with a stoichiometric composition and setting the content of Ca in the A site to be 0.05 to 0.20 on a molar basis, there can be provided a semiconductor ceramic that has high reliability and in which the degradation of resistance can be suppressed even when the semiconductor ceramic is exposed in a high-humidity atmosphere for a long time.

The present invention is based on the finding described above. The semiconductor ceramic according to the present invention is a lead-free semiconductor ceramic that substantially does not contain Pb, the semiconductor ceramic including a $Ba_m TiO_3$-based composition, as a main component, having a perovskite structure represented by general formula $A_m BO_3$, wherein the molar ratio m between the A site and the B site satisfies $1.001 \leq m \leq 1.01$; a part of Ba constituting the A site is replaced with Na, Bi, Ca, and a rare-earth element; and the molar content of the Ca when the total number of moles of the elements constituting the A site is 1 mole is 0.05 to 0.20.

Herein, the phrase "substantially does not contain Pb" means that Pb is not added intentionally. A composition system to which Pb is not added intentionally is referred to as a lead-free system in the present invention.

In the semiconductor ceramic of the present invention, the molar ratio m preferably satisfies $1.001 \leq m \leq 1.004$.

In the semiconductor ceramic of the present invention, the content of the Ca is preferably 0.125 to 0.175 on a molar ratio basis.

A PTC thermistor of the present invention includes a component body and a pair of outer electrodes formed on surfaces of the component body, wherein the component body is formed of the semiconductor ceramic described above.

Advantages

The semiconductor ceramic of the present invention includes a $Ba_mTiO_3$-based composition, as a main component, having a perovskite structure represented by general formula $A_mBO_3$, wherein the molar ratio m between the A site and the B site satisfies $1.001 \leq m \leq 1.01$ (preferably $1.001 \leq m \leq 1.004$); part of Ba constituting the A site is replaced with Na, Bi, Ca, and a rare-earth element; and the mole content of the Ca when the total number of moles of the elements constituting the A site is 1 mole is 0.05 to 0.20 (preferably 0.125 to 0.175). Therefore, there can be provided a semiconductor ceramic that has desired PTC characteristics and high reliability and in which the variation in resistance is suppressed even when the semiconductor ceramic is exposed in a high-humidity atmosphere for a long time.

The PTC thermistor of the present invention includes a component body and a pair of outer electrodes formed on surfaces of the component body, wherein the component body is formed of the semiconductor ceramic described above. Therefore, there can be provided a PTC thermistor having high reliability and desired PTC characteristics.

Specifically, there can be provided a lead-free PTC thermistor that has satisfactory PTC characteristics and high reliability and in which the percentage change in resistivity can be suppressed to 30% or less even when the PTC thermistor is left in a high-humidity atmosphere of 85% RH for 1000 hours.

DESCRIPTION OF THE INVENTION

Figure 1:
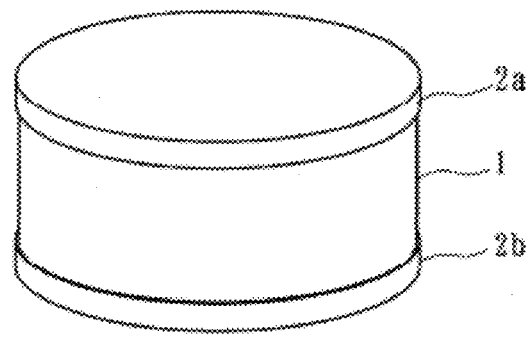
FIG. 1 is a perspective view showing an embodiment of a PTC thermistor according to the present invention.

An embodiment of the present invention will now be described.

The main component of a semiconductor ceramic according to an embodiment of the present invention has a perovskite structure represented by general formula (A).

$(Ba_{1-w-x-y-z}Na_wBi_xCa_yLn_z)_mTiO_3$  (A)

Ln is a rare-earth element serving as a semiconductorizing agent. The rare-earth element Ln is not particularly limited as long as it serves as a semiconductorizing agent, and La or the like can be preferably used.

In this embodiment, the molar ratio m between an A site (Ba site) and a B site (Ti site) and the molar amount y of Ca contained in the A site satisfy mathematical formulas (1) and (2), respectively.

$1.001 \leq m \leq 1.01$  (1)

$0.05 \leq y \leq 0.20$  (2)

The molar ratio m between the A site and the B site is set to be 1.001 or more because, if the molar ratio m is less than 1.001, the resistance value is significantly degraded over time when the semiconductor ceramic is exposed in a high-humidity atmosphere for a long time, which may impair the reliability.

The semiconductor ceramic of this embodiment contains a Na compound and a Ti compound as raw materials. Therefore, when the raw materials are mixed and a heat treatment (calcination) is performed thereon, the Na and Ti react with each other and thus an Na—Ti compound is produced.

According to the analysis of semiconductor ceramics after firing, which are samples having different molar ratios m, the analysis being performed by the inventors of the present invention using a TEM-EDX (transmission electron microscope-energy dispersive X-ray analyzer), it was found that when the molar ratio m was less than 1.001, most of the Na—Ti compound was distributed at the grain boundary triple points or in the grain boundaries near the grain boundary triple points (refer to Example described below).

The Na—Ti compound is easily dissolved in water. Therefore, when the semiconductor ceramic is exposed in a high-humidity atmosphere for a long time, Na that is present at the grain boundary triple points is ionized and reacts with water vapor contained in that atmosphere. Then, the Na ions are eluted in the form of sodium hydroxide and erode the outer electrodes of a PTC thermistor. As a result, the resistance value is increased and the degradation of resistance may be caused. Furthermore, when the Na ions are eluted and precipitated in the grain boundaries, the grain boundary resistance is increased and thus the resistance value is increased, which may also cause the degradation of resistance over time. As described below, the resistance value can be decreased by incorporating Ca in the semiconductor ceramic. However, when the molar ratio m is less than 1.001 and there is a high-humidity atmosphere, the resistance value cannot be prevented from being increased even if Ca is incorporated, which may cause the degradation of resistance over time.

On the other hand, since a molar ratio m of more than 1.01 provides an excessively A-site-rich state, Na and Bi, which have an ionic radius smaller than that of Ba, are precipitated in the grain boundaries. Among the components precipitated in the grain boundaries, in particular, Na is ionized through the reaction with water vapor contained in the atmosphere. As a result, the Na ions eluted in the form of sodium hydroxide similarly erode the outer electrodes of a PTC thermistor or increase the grain boundary resistance to increase the resistance value, which may cause the degradation of resistance over time.

In contrast, when the molar ratio m is 1.001 to 1.01, the Na—Ti compound is not segregated at the grain boundary triple points and a properly A-site-rich state is achieved. Therefore, by setting the molar amount y of Ca within the range specified by the mathematical formula (2), the resistance value can be prevented from being increased as much as possible even if the semiconductor ceramic is exposed in a high-humidity atmosphere for a long time and thus variation in resistance can be suppressed.

Accordingly, the composition in this embodiment is determined so that the molar ratio m between the A site and the B site is 1.001 to 1.01 as shown in the mathematical formula (1). To achieve higher reliability, the molar ratio m is preferably 1.001 to 1.004.

By incorporating Ca so that the molar amount y of Ca is set within the range specified by the mathematical formula (2), the reliability can be improved. This reason is believed to be as follows in terms of ionic radii of components.

According to R. D. Shanon, "Acta. Crystallography" A, vol. 32 (1976), the ionic radius of Ba ions is 1.49 Å and the ionic radii of Na ions, Bi ions, and Ca ions are respectively 1.16 Å, 1.17 Å, and 1.14 Å. In other words, the ionic radii of Na ions, Bi ions, and Ca ions are smaller than that of Ba ions.

Therefore, the size of a crystal lattice is decreased by dissolving Ca in the A site, and the Na ions and Bi ions having a small ionic radius are stably present in the crystal grains. In particular, since the Na ions and Bi ions have an ionic radius close to that of Ca ions, the numbers of Na ions and Bi ions precipitated in the grain boundaries can be decreased even in an A-site-rich state. That is, in the case where ions contained in the A site are precipitated in the grain boundaries due to the A-site-rich state, Ca ions having an ionic radius close to those of Na ions and Bi ions are also forced out and precipitated in the grain boundaries together with the Na ions and Bi ions. Thus, assuming that the total number of ions precipitated is constant, the number of Na ions easily eluted in a high-humidity atmosphere is relatively decreased by the number of Ca ions. Consequently, even when the semiconductor ceramic is exposed in a high-humidity atmosphere for a long time, the variation in resistance over time can be suppressed.

In addition, by replacing part of Ba with Ca, the ratio of the c crystallographic axis to the crystallographic a axis is increased and thus the tetragonal crystallinity of the crystal is improved. As a result, spontaneous polarization is increased and the grain boundary barrier can be eliminated. This can decrease the resistance value of the semiconductor ceramic and thus a PTC thermistor suitably used for a heater or the like can be obtained.

If the molar amount y of Ca in the A site is less than 0.05, the content of Ca is excessively low and thus the size of the crystal lattice cannot be sufficiently decreased. That is, since an A-site-rich state is provided and also the size of the crystal lattice cannot be decreased, Na ions and Bi ions having an ionic radius smaller than that of Ba ions are precipitated in the grain boundaries. The precipitated ions having a small ionic radius, particularly Na ions, are eluted through the reaction with water vapor contained in the atmosphere. Such ions erode the outer electrodes of a PTC thermistor or increase the grain boundary resistance to increase the resistance value as described above, which is believed to cause a variation in resistance.

On the other hand, the solid solubility limit of Ca is exceeded if the molar amount y of Ca is more than 0.20 and a large number of hetero-phases are precipitated in the grain boundaries or at the grain boundary triple points. Since the hetero-phases are unstable, they are eluted or react with carbon dioxide or the like in the air when the semiconductor ceramic is exposed in a high-humidity atmosphere for a long time. As a result, the resistance value is increased, which may cause a variation in resistance.

Accordingly, the composition in this embodiment is determined so that the molar amount y of Ca in the A site is 0.05 to 0.20. To further suppress a variation in resistance over time and thus achieve high reliability, the molar amount y of Ca in the A site is preferably 0.125 to 0.175.

In this embodiment, the composition is determined so that the molar ratio m between the A site and the B site and the molar amount y of Ca satisfy the mathematical formulas (1) and (2), respectively, whereby the variation in resistance can be suppressed without impairing PTC characteristics even if the semiconductor ceramic is exposed in a high-humidity atmosphere for a long time. Consequently, reliability can be improved.

Regarding the molar amount w of Na and the molar amount x of Bi in the A site, the total molar amount (w+x) is preferably 0.02 to 0.20. If the total molar amount of (w+x) is less than 0.02, the Curie temperature Tc cannot be sufficiently increased because the Curie temperature Tc is increased by replacing part of Ba with Na and Bi. If the total molar amount (w+x) is more than 0.20, the composition is easily shifted from the theoretical composition of a sintered body because Na and Bi are easily volatilized.

The molar amount z of rare-earth element Ln in the A site is preferably 0.0005 to 0.015. If the molar amount z of rare-earth element Ln serving as a semiconductorizing agent is less than 0.0005 or more than 0.015, it may be difficult to achieve the semiconductorization.

In the present invention, 0.0001 to 0.0020 parts by mole of Mn is preferably added relative to 1 part by mole of main component represented by the general formula (A) to improve PTC characteristics.

In this case, the semiconductor ceramic is represented by general formula (B).

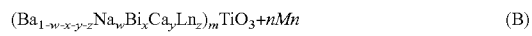

$$(Ba_{1-w-x-y-z}Na_wBi_xCa_yLn_z)_mTiO_3 + nMn \quad (B)$$

where n satisfies $0.0001 \leq n \leq 0.0020$.

Mn functions as an acceptor. Therefore, by adding Mn within the range described above, an acceptor is formed in the grain boundaries and thus the number of PTC digits can be increased. As a result, the PTC characteristics can be further improved. The form of Mn added is not particularly limited, and any manganese compound such as sol or powder of manganese oxide or an aqueous manganese nitrate solution can be used.

A PTC thermistor that uses the above-described semiconductor ceramic will now be specifically described.

FIG. 1 is a perspective view schematically showing an embodiment of the PTC thermistor.

The PTC thermistor includes a component body 1 formed of the above-described semiconductor ceramic and a pair of outer electrodes 2a and 2b formed on both ends (surfaces) of the component body 1. The outer electrodes 2a and 2b have a single-layer structure or a multi-layer structure composed of a conductive material such as Cu, Ni, Al, Cr, a Ni—Cr alloy, or a Ni—Cu alloy.

In this embodiment, the external appearance has a columnar shape, but may have a disc-like shape or a rectangular parallelepiped shape.

A method for producing the PTC thermistor will now be described.

First, a Ba compound, a Ca compound, a Na compound, a Bi compound, and a Ln compound containing a predetermined rare-earth element Ln are prepared as raw materials. The raw materials are weighed and mixed to obtain a mixed powder so that the semiconductor ceramic has a predetermined composition ratio.

Subsequently, an organic solvent and a polymer-based dispersant are added to the mixed powder and thoroughly mixed and ground by a wet method in a ball mill using grinding media such as PSZ (partially stabilized zirconia) balls. The solvent is then eliminated and sizing is performed using a mesh having a predetermined opening. The mixture is subjected to heat treatment at 800 to 1000° C. for 2 hours to obtain a calcined powder. A vinyl acetate-based organic binder and pure water and, optionally, a Mn compound are added to the calcined powder and thoroughly mixed and ground again by a wet method using grinding media to obtain a slurry. The resultant slurry is dried to obtain a raw material powder. The raw material powder is then sized using a mesh having a predetermined opening and compression-molded using a press such as a uniaxial press to obtain a compact.

The compact is subjected to debinding treatment at 500 to 600° C. in an air atmosphere, a nitrogen atmosphere, or a mixed stream of air and nitrogen. Subsequently, the compact is fired in a nitrogen atmosphere whose oxygen concentration is about 500 to 30000 ppm by volume at a temperature that achieves semiconductorization, e.g., at a maximum firing temperature of 1250 to 1450° C. for a predetermined time to obtain a component body 1, which is a sintered body.

Outer electrodes 2a and 2b are formed on both ends of the component body 1 by plating, sputtering, electrode baking, or the like to produce a PTC thermistor.

The present invention is not limited to the above-described embodiment. For example, the semiconductor ceramic needs only to be mainly composed of $Ba_mTiO_3$ and part of Ba needs only to be replaced with predetermined amounts of Na, Bi, Ca, and a rare-earth element. Even if incidental impurities are mixed, the characteristics are not affected. For example, about 0.2 to 0.3% by weight of the PSZ balls in total used as grinding media when mixing and grinding are performed by a wet method, but this does not affect the characteristics. Similarly, trace amounts, such as about 10 ppm by weight, of Fe, Si, and Cu may be mixed in the raw materials, but this does not affect the characteristics. The semiconductor ceramic of the present invention is a lead-free semiconductor ceramic. As described earlier, it is only required that the semiconductor ceramic substantially does not contain Pb, and Pb incidentally mixed in a concentration of about 10 ppm or less by weight is not necessarily excluded as long as it does not affect the characteristics.

Examples of the present invention will now be specifically described.

$BaCO_3$, $CaCO_3$, $Na_2CO_3$, $Bi_2O_3$, $TiO_2$ and $La_2O_3$, which were raw materials of a main component, were prepared and then weighed and mixed to obtain a mixed powder so that the sintered body had the composition shown in Table 1.

Subsequently, ethanol (organic solvent) and a polymer-based dispersant were added to the mixed powder and mixed and ground by a wet method in a ball mill using PSZ balls for 24 hours. The ethanol was driven off and sizing was performed using a mesh having an opening of 300 μm. The mixture was subjected to a heat treatment at 800 to 1000° C. for 2 hours to obtain a calcined powder.

A vinyl acetate-based organic binder and an aqueous manganese nitrate solution were added to the calcined powder and mixed and ground by a wet method in a ball mill using PSZ balls for 16 hours to obtain a slurry. The amount of the aqueous manganese nitrate solution added was adjusted to be 0.00025 parts by mole on a Mn basis relative to 1 part by mole of main component.

The slurry was dried and sized using a mesh having an opening of 300 μm to obtain a raw material powder.

The raw material powder was compression-molded using a uniaxial press at a pressure of $9.8 \times 10^7$ Pa (1000 kgf/cm²) to obtain a disc-shaped compact having a diameter of 14 mm and a thickness of 2.5 mm.

The disc-shaped compact was subjected to a debinding treatment in the air at 600° C. for 2 hours. The compact was fired in a nitrogen atmosphere whose oxygen concentration was 8000 ppm by volume at a maximum firing temperature of 1400° C. for 2 hours to obtain sintered bodies (semiconductor ceramics) with a sample number of 1 to 28.

Subsequently, the sintered bodies were lapped and then subjected to dry plating to form outer electrodes having a three-layer structure of NiCr/NiCu/Ag. Consequently, sample Nos. 1 to 28 were prepared.

Regarding sample Nos. 1 to 28, the electrical resistivity $\rho_0$ at 25° C. (room temperature), the number of digits of PTC ΔR, and the Curie temperature Tc were determined.

The electrical resistivity $\rho_0$ was measured by a direct current four-terminal method through the application of a voltage of 1 V at 25° C.

The number of digits of PTC ΔR indicates the performance of a PTC thermistor, and is defined by the logarithm of the ratio between the maximum value ρmax and the minimum value ρmin of electrical resistivity as represented by mathematical formula (3).

$$\Delta R = \log(\rho max/\rho min) \quad (3)$$

Therefore, the characteristics (hereinafter referred to as "ρ-T characteristics") between temperature T and electrical resistivity ρ were measured, and the number of digits of PTC was determined using the maximum value and the minimum value.

The Curie temperature Tc was defined as a temperature at which the electrical resistivity $\rho_0$ at 25° C. was doubled, and determined from the ρ-T characteristics.

Furthermore, a humidity test was performed to evaluate reliability. Five specimens of each sample were left in a constant temperature and humidity chamber at 85° C. and 85% RH for 1000 hours. The electrical resistivity $\rho_1$ after the humidity test was measured at 25° C., and the difference Δρ ($=\rho_1-\rho_0$) between the electrical resistivity $\rho_1$ and the electrical resistivity $\rho_0$ was determined. The percentage change in resistivity $\Delta\rho/\rho_0$ was calculated for the five specimens, and the reliability was evaluated based on the average value of the percentage changes in resistivity $\Delta\rho/\rho_0$.

Table 1 shows the compositions and measurement results of the sample Nos. 1 to 28.

The samples having a percentage change in resistivity $\Delta\rho/\rho_0$ of 30% or less were judged as good. The percentage change in resistivity $\Delta\rho/\rho_0$ is an average value of five specimens.

TABLE 1

Composition formula: $(Ba_{1-w-x-y-z}Na_wBi_xCa_yLa_z)_mTiO_3 + 0.00025Mn$

| Sample No. | m | w | x | y | z | Electrical resistivity $\rho_0$ (Ω·cm) | Number of digits of PTC ΔR | Curie temperature Tc (° C.) | Percentage change in resistivity $\Delta\rho/\rho_0$ (%) |
|---|---|---|---|---|---|---|---|---|---|
| 1* | 0.990 | 0.05 | 0.05 | 0 | 0.002 | 238 | 5.3 | 175 | 247.9 |
| 2* | 0.998 | 0.05 | 0.05 | 0.025 | 0.002 | 49 | 4.5 | 166 | 60.8 |
| 3* | 1.004 | 0.05 | 0.05 | 0.025 | 0.002 | 40 | 3.9 | 170 | 49.1 |
| 4* | 1.015 | 0.05 | 0.05 | 0.025 | 0.002 | 35 | 3.2 | 172 | 66.3 |
| 5 | 1.001 | 0.05 | 0.05 | 0.05 | 0.002 | 33 | 3.9 | 165 | 12.0 |
| 6 | 1.004 | 0.05 | 0.05 | 0.05 | 0.002 | 33 | 3.8 | 167 | 11.5 |
| 7 | 1.010 | 0.05 | 0.05 | 0.05 | 0.002 | 30 | 3.2 | 169 | 27.1 |

TABLE 1-continued

Composition formula: $(Ba_{1-w-x-y-z}Na_wBi_xCa_yLa_z)_mTiO_3 + 0.00025Mn$

| Sample No. | m | w | x | y | z | Electrical resistivity $\rho_0$ (Ω·cm) | Number of digits of PTC ΔR | Curie temperature Tc (°C) | Percentage change in resistivity $\Delta\rho/\rho_0$ (%) |
|---|---|---|---|---|---|---|---|---|---|
| 8 | 1.001 | 0.05 | 0.05 | 0.125 | 0.002 | 29 | 3.6 | 161 | 4.6 |
| 9 | 1.004 | 0.05 | 0.05 | 0.125 | 0.002 | 28 | 3.6 | 159 | 5.2 |
| 10* | 0.998 | 0.05 | 0.05 | 0.15 | 0.002 | 47 | 3.6 | 152 | 38.4 |
| 11 | 1.001 | 0.05 | 0.05 | 0.15 | 0.002 | 28 | 3.4 | 155 | 3.8 |
| 12 | 1.004 | 0.05 | 0.05 | 0.15 | 0.0005 | 33 | 3.6 | 157 | 5.1 |
| 13 | 1.004 | 0.05 | 0.05 | 0.15 | 0.015 | 34 | 3.3 | 152 | 3.1 |
| 14 | 1.004 | 0.01 | 0.01 | 0.15 | 0.002 | 23 | 3.2 | 137 | 3.8 |
| 15 | 1.004 | 0.1 | 0.1 | 0.15 | 0.002 | 33 | 3.4 | 179 | 9.0 |
| 16 | 1.004 | 0.051 | 0.049 | 0.15 | 0.002 | 31 | 3.5 | 153 | 3.5 |
| 17 | 1.004 | 0.05 | 0.05 | 0.15 | 0.002 | 27 | 3.3 | 158 | 4.2 |
| 18 | 1.008 | 0.05 | 0.05 | 0.15 | 0.002 | 24 | 3.3 | 160 | 15.2 |
| 19 | 1.010 | 0.05 | 0.05 | 0.15 | 0.002 | 24 | 3.2 | 159 | 17.0 |
| 20* | 1.015 | 0.05 | 0.05 | 0.15 | 0.002 | 19 | 3.0 | 164 | 45.6 |
| 21 | 1.001 | 0.05 | 0.05 | 0.175 | 0.002 | 32 | 3.8 | 149 | 5.1 |
| 22 | 1.004 | 0.05 | 0.05 | 0.175 | 0.002 | 30 | 3.5 | 156 | 8.1 |
| 23 | 1.001 | 0.05 | 0.05 | 0.20 | 0.002 | 35 | 3.6 | 149 | 14.8 |
| 24 | 1.004 | 0.05 | 0.05 | 0.20 | 0.002 | 34 | 3.6 | 150 | 17.8 |
| 25 | 1.010 | 0.05 | 0.05 | 0.20 | 0.002 | 33 | 3.4 | 148 | 28.8 |
| 26* | 0.998 | 0.05 | 0.05 | 0.25 | 0.002 | 88 | 6.6 | 139 | 123.9 |
| 27* | 1.004 | 0.05 | 0.05 | 0.25 | 0.002 | 52 | 5.2 | 144 | 100.8 |
| 28* | 1.015 | 0.05 | 0.05 | 0.25 | 0.002 | 49 | 4.4 | 148 | 222.4 |

*Outside the scope of the present invention

Sample No. 1 had an extremely high percentage change in resistivity $\Delta\rho/\rho_0$ of 247.9% and a high electrical resistivity $\rho_0$ of 238 Ω·cm. This may be because there was a B-site-rich state since the molar ratio m was 0.990, Na ions and Bi ions having an ionic radius smaller than that of Ba ions were precipitated at the grain boundary triple points and thus the resistance value was significantly increased after the humidity test. As described earlier, Ca has a function of decreasing electrical resistivity. However, since the Ca was not present at all, the electrical resistivity $\rho_0$ is believed to have been increased.

Subsequently, a composition analysis was performed on the sample No. 1 using a TEM-EDX to measure the ratios between Na and Ti in the crystal grains and at the grain boundary triple points.

Figure 2:
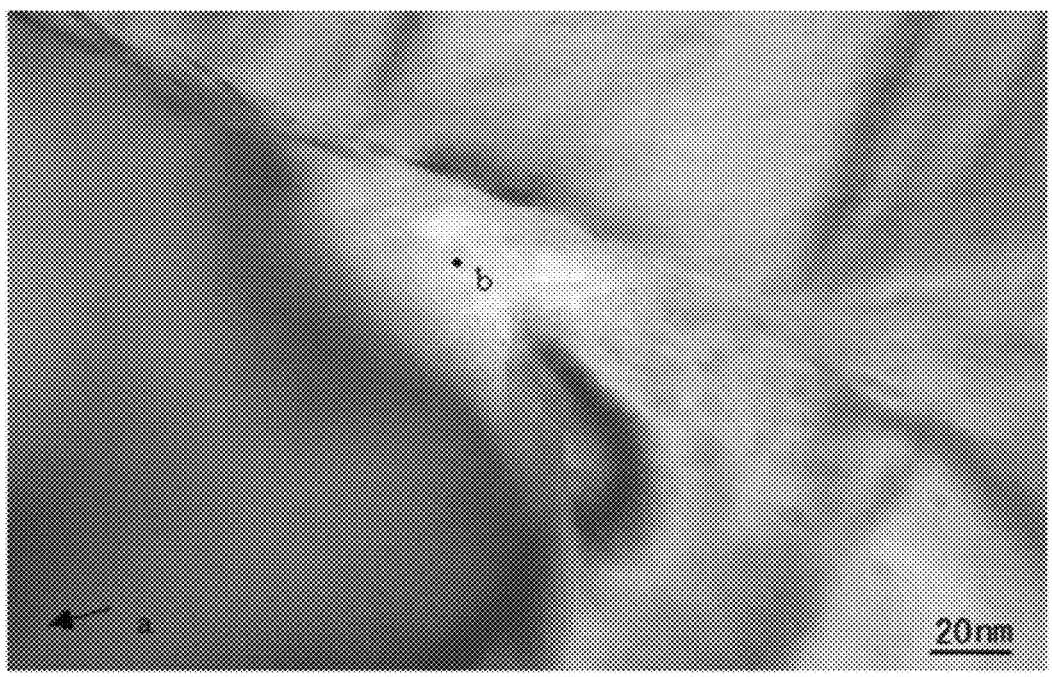
FIG. 2 is a TEM image of a sample No. 1.

FIG. 2 is a TEM image.

In FIG. 2, point a is a measurement point in the crystal grains and point b is a measurement point at the grain boundary triple points. According to the composition analysis with a TEM-EDX, the ratios Na/Ti were 0.0527 at the point a and 0.1989 at the point b. Thus, it was found that Na that reacted with Ti was present at the grain boundary triple points in an amount larger than that in the crystal grains, and therefore the Na—Ti compound was preferentially precipitated at the grain boundary triple points.

Sample No. 2 had a high percentage change in resistivity $\Delta\rho/\rho_0$ of 60.8%. This may be because there was a B-site-rich state since the molar ratio m was 0.998, and the molar amount y of Ca was an excessively low value of 0.025, so that a Na—Ti compound was preferentially precipitated at the grain boundary triple points as in the sample No. 1. As a result, it is believed that the resistance value was increased after the humidity test for the same reason as described above.

Sample No. 3 had a high percentage change in resistivity $\Delta\rho/\rho_0$ of 49.1%. This may be because the molar ratio m was 1.004, which was within the scope of the present invention, but the molar amount y of Ca was an excessively low value of 0.025, so that Na ions and Bi ions having an ionic radius smaller than that of Ba ions were precipitated in the grain boundaries. As a result, it is believed that the resistance value was increased after the humidity test for the same reason as described above.

Sample No. 4 had a high percentage change in resistivity $\Delta\rho/\rho_0$ of 66.3%. This may be because the molar and y of Ca was an excessively low value of 0.025 as in the sample Nos. 1 and 2 and also the molar ratio m was 1.015, which was an excessively A-site-rich state, so that Na and Bi whose solid solubility limit was exceeded were precipitated in the grain boundaries. As a result, it is believed that the resistance value was increased after the humidity test for the same reason as described above.

Sample No. 10 had a high percentage change in resistivity $\Delta\rho/\rho_0$ of 38.4%. Since the molar ratio m was 0.998, which was a B-site-rich state, it appears that the Na—Ti compound was preferentially precipitated at the grain boundary triple points as in the sample No. 1. As a result, it is believed that the resistance value was increased after the humidity test for the same reason as described above.

Sample No. 20 had a high percentage change in resistivity $\Delta\rho/\rho_0$ of 45.6%. This may be because the molar ratio m was 1.015, which was an excessively A-site-rich state, and Na ions and Bi ions having an ionic radius smaller than that of Ba ions were precipitated in the grain boundaries.

Sample No. 26 had an extremely high percentage change in resistivity $\Delta\rho/\rho_0$ of 123.9%. Since the molar ratio m was 0.998, which was a B-site-rich state, it appears the Na—Ti compound was preferentially precipitated at the grain boundary triple points. This may also be the consequence of the molar ratio of Ca having an excessively high value of 0.25, so that the solid solubility limit of Ca was exceeded and heterophases were precipitated at the grain boundary triple points and in the grain boundaries. This may have increased the resistance value after the humidity test.

Sample No. 27 had an extremely high percentage change in resistivity $\Delta\rho/\rho_0$ of 100.8%. This may be because, although the molar ratio m was 1.004, which was within the scope of the present invention, the molar amount of Ca was an excessively high value of 0.25, so that the solid solubility limit of Ca was exceeded and hetero-phases were precipitated at the grain boundary triple points and in the grain boundaries. This may have significantly increased the resistance value after the humidity test.

Sample No. 28 had an extremely high percentage change in resistivity $\Delta\rho/\rho_0$ of 222.4%. Since the molar ratio m was 1.015, which was an excessively A-site-rich state, and the molar amount y of Ca was an excessively high value of 0.25, the solid solubility limit of Ca was exceeded and hetero-phases were precipitated at the grain boundary triple points and in the grain boundaries. This may have significantly increased the resistance value after the humidity test.

In contrast, the molar ratio m was 1.001 to 1.01, which were properly A-site-rich states, and the molar amount y of Ca was 0.05 to 0.20 in the sample Nos. 5 to 9, 11 to 19, and 21 to 25. The percentage change in resistivity $\Delta\rho/\rho_0$ was decreased to 30% or less and thus high reliability was achieved. In addition, the electrical resistivity $\rho_{25}$ was 35 Ω·cm or less and the number of digits of PTC ΔR was 3.2 or more.

In particularly, the percentage change in resistivity $\Delta\rho/\rho_0$ could be decreased to 18% or less when the molar ratio m was 1.001 to 1.004 or the molar amount y of Ca was 0.125 to 0.175. Furthermore, when the molar ratio m was 1.001 to 1.004 and the molar amount y of Ca was 0.125 to 0.175, the percentage change in resistivity $\Delta\rho/\rho_0$ could be further decreased to 10% or less.

In other words, it was confirmed that the molar ratio m was more preferably 1.001 to 1.004 and the molar amount y of Ca was more preferably 0.125 to 0.175.

1 component body
2a, 2b outer electrode

The invention claimed is:

1. A lead-free semiconductor ceramic that substantially does not contain Pb comprising:
   a $Ba_mTiO_3$-based composition, as a main component, having a perovskite structure represented by general formula $A_mBO_3$,
   wherein the molar ratio m between an A site and a B site satisfies $1.001 \leq m \leq 1.01$,
   part of Ba constituting the A site is replaced with Na, Bi, Ca, and a rare-earth element, and
   the molar content of the Ca when the total number of moles of the elements constituting the A site is 1 mole is 0.05 to 0.20.

2. The semiconductor ceramic according to claim 1, wherein $1.001 \leq m \leq 1.004$.

3. The semiconductor ceramic according to claim 2, wherein the molar content of the Ca is 0.125 to 0.175.

4. A lead-free semiconductor ceramic that substantially does not contain Pb comprising:
   a $Ba_mTiO_3$-based composition, as a main component, having a perovskite structure represented by general formula $A_mBO_3$,
   wherein the molar ratio m between an A site and a B site satisfies $1.001 \leq m \leq 1.04$,
   part of Ba constituting the A site is replaced with Na, Bi, Ca, and a rare-earth element, and
   the molar content of the Ca when the total number of moles of the elements constituting the A site is 1 mole is 0.12 to 0.175,
   wherein the semiconductor ceramic has a compositional formula of $(Ba_{1-w-x-y-z}Na_wBi_xCa_yLn_z)_mTiO_3$ in which Ln is the rare earth metal, w+x is 0.02 to 0.2, and z is 0.0005 to 0.015.

5. The semiconductor ceramic according to claim 4, further comprising 0.0001 to 0.002 moles of Mn per mole of main component.

6. The semiconductor ceramic according to claim 1, wherein the molar content of the Ca is 0.125 to 0.175.

7. The semiconductor ceramic according to claim 6, further comprising 0.0001 to 0.002 moles of Mn per mole of main component.

8. A lead-free semiconductor ceramic that substantially does not contain Pb comprising:
   a $Ba_mTiO_3$-based composition, as a main component, having a perovskite structure represented by general formula $A_mBO_3$,
   wherein the molar ratio m between an A site and a B site satisfies $1.001 \leq m \leq 1.01$,
   part of Ba constituting the A site is replaced with Na, Bi, Ca, and a rare-earth element, and
   the molar content of the Ca when the total number of moles of the elements constituting the A site is 1 mole is 0.05 to 0.20,
   wherein the semiconductor ceramic has a compositional formula of $(Ba_{1-w-x-y-z}Na_wBi_xCa_yLn_z)_mTiO_3$ in which Ln is the rare earth metal, w+x is 0.02 to 0.2, and z is 0.0005 to 0.015.

9. The semiconductor ceramic according to claim 8, further comprising 0.0001 to 0.002 moles of Mn per mole of main component.

10. The semiconductor ceramic according to claim 9, wherein $0.01 \leq x \leq 0.05$ and $0.01 \leq w \leq 0.05$.

11. A positive temperature coefficient thermistor comprising a component body and a pair of electrodes on outer surfaces of the component body, wherein the component body is formed of the semiconductor ceramic according to claim 9.

12. A positive temperature coefficient thermistor comprising a component body and a pair of electrodes on outer surfaces of the component body, wherein the component body is formed of the semiconductor ceramic according to claim 8.

13. A positive temperature coefficient thermistor comprising a component body and a pair of electrodes on outer surfaces of the component body, wherein the component body is formed of the semiconductor ceramic according to claim 7.

14. A positive temperature coefficient thermistor comprising a component body and a pair of electrodes on outer surfaces of the component body, wherein the component body is formed of the semiconductor ceramic according to claim 6.

15. A positive temperature coefficient thermistor comprising a component body and a pair of electrodes on outer surfaces of the component body, wherein the component body is formed of the semiconductor ceramic according to claim 5.

16. A positive temperature coefficient thermistor comprising a component body and a pair of electrodes on outer surfaces of the component body, wherein the component body is formed of the semiconductor ceramic according to claim 4.

17. A positive temperature coefficient thermistor comprising a component body and a pair of electrodes on outer surfaces of the component body, wherein the component body is formed of the semiconductor ceramic according to claim 3.

18. A positive temperature coefficient thermistor comprising a component body and a pair of electrodes on outer surfaces of the component body, wherein the component body is formed of the semiconductor ceramic according to claim 2.

19. A positive temperature coefficient thermistor comprising a component body and a pair of electrodes on outer surfaces of the component body, wherein the component body is formed of the semiconductor ceramic according to claim 1.

* * * * *